(12) United States Patent
Zubieta

(10) Patent No.: US 6,643,156 B2
(45) Date of Patent: Nov. 4, 2003

(54) TRANSFORMERLESS TWO-PHASE INVERTER

(75) Inventor: Luis Zubieta, Calgary (CA)

(73) Assignee: Global Thermoelectric Inc., Calgary (CA)

(*) Notice: Subject to any disclaimer, the term of this patent is extended or adjusted under 35 U.S.C. 154(b) by 0 days.

(21) Appl. No.: 10/065,574

(22) Filed: Oct. 31, 2002

(65) Prior Publication Data

US 2003/0090912 A1 May 15, 2003

(51) Int. Cl.$^7$ .......................................... H02M 7/5387
(52) U.S. Cl. ........................ 363/132; 363/98; 363/137
(58) Field of Search ........................... 363/17, 98, 131, 363/132, 136, 137, 138

(56) References Cited

U.S. PATENT DOCUMENTS

| | | | |
|---|---|---|---|
| 4,136,382 A | 1/1979 | Ricci | 363/137 |
| 4,546,301 A | 10/1985 | Tinebor et al. | 318/798 |
| 4,574,341 A | 3/1986 | Hellegaard et al. | 363/56 |
| 5,075,565 A | 12/1991 | Severinsky et al. | 307/66 |
| 5,136,216 A | 8/1992 | Wills et al. | 318/123 |
| 5,146,147 A | 9/1992 | Wills et al. | 318/797 |
| 5,198,971 A | 3/1993 | Recker et al. | |
| 5,218,283 A | 6/1993 | Wills et al. | 318/748 |
| 5,315,497 A | 5/1994 | Severinsky | 363/34 |
| 5,339,348 A | 8/1994 | Wirth et al. | 378/93 |
| 5,406,185 A | 4/1995 | Strunk | 318/747 |
| 5,481,451 A * | 1/1996 | Kuwahara | 363/37 |
| 5,610,806 A * | 3/1997 | Blasko et al. | 363/41 |
| 5,638,266 A | 6/1997 | Horie et al. | 363/132 |
| 5,933,344 A | 8/1999 | Mitsuishi et al. | 364/142 |
| 6,282,111 B1 * | 8/2001 | Illingworth | 363/98 |
| 6,310,787 B2 * | 10/2001 | Ito et al. | 363/98 |
| 6,324,085 B2 * | 11/2001 | Kimura et al. | 363/132 |
| 6,339,538 B1 * | 1/2002 | Handleman | 363/98 |

FOREIGN PATENT DOCUMENTS

JP 06338836 12/1994

\* cited by examiner

Primary Examiner—Michael Sherry
Assistant Examiner—Gary L. Laxton
(74) Attorney, Agent, or Firm—Bennett Jones LLP

(57) ABSTRACT

A DC to two-phase AC inverter that includes three one-leg switch mode inverters circuits or a three-phase bridge circuit and a controller/driver circuit. The controller/driver circuit includes a triangular waveform generator and two sinusoidal reference waveform generators out of phase with each other, the sinusoidal waveforms generated at the desired AC output frequency, and the triangular waveform generated at a higher frequency. The controller/driver circuit is configured to drive one leg of the bridge circuit with a 50% duty cycle at the triangular waveform frequency and the other two legs at the triangular waveform frequency with pulse width modulated signals, the pulse widths of each signal varying with a discrete one of the sinusoidal waveforms. Each phase of two-phase AC is provided by the inverter between the leg driven at the 50% duty cycle and a discrete one of the other legs.

12 Claims, 5 Drawing Sheets

TRANSFORMERLESS TWO-PHASE INVERTER

BACKGROUND OF INVENTION

The present invention relates to field of DC to AC inverters, and in particular, to transformerless inverters for converting a DC voltage to two-phase AC.

Two-phase AC electrical systems are commonly used and required in residential and industrial applications to power different types of loads. A two-phase AC system consists of two AC voltages 180 degrees out of phase with respect of a common neutral to produce a system with two different output voltages: one between each phase and neutral and one between the two phases. A common residential 240/120 VAC system is typical of such a two-phase system.

Two-phase systems are usually produced from a single-phase source connected to a transformer with center tap output, which gives the two required AC sources. The single-phase source may come from any power generation equipment including a conventional power electronics inverter as illustrated in FIG. 1. In power generation systems in the range of a few kilowatts, it is desirable to reduce the size and weight of the unit. An output transformer operating at low frequencies represents a very bulky piece of equipment, and a transformerless system would clearly be advantageous in this respect.

In a one-leg inverter, two high-power switching transistors are used. One switch is connected to the positive rail of the DC source and tied to a common node. The other switch is connected to the negative rail and tied to the common node. The AC power is extracted from the common node with respect to a neutral point at the middle voltage of the DC bus. This switch configuration is the fundamental block used in conventional inverters and is well known in the art.

It is known to use three one-leg inverter configurations to transform DC power to three-phase AC power. A three-phase bridge essentially consists of three one-leg inverters which are synchronized so that each of the three phases are separated by 120°.

Theoretically, a two-phase source may be generated from two one-leg inverter modules fed by a DC-link with a mid-potential connection as shown in FIG. 2. In this case, each of the inverter legs is switched to modulate the desired waveforms with respect of the neutral midpoint. However, a problem with this circuit is that any DC component introduced by the load will result in an unbalance between the upper and the lower half of the DC-link and eventually may result in incorrect system operation. Furthermore the mid-potential point from the DC-link is not always accessible.

Therefore, there is a need in the art for a two-phase DC to AC inverter which mitigates the difficulties known or presented in the prior art.

SUMMARY OF INVENTION

In general terms, the invention comprises a transformerless DC to two-phase AC inverter. In one aspect, the invention comprises an apparatus for converting DC power to two-phase AC power, comprising:

(a) three one-leg switch mode inverters wherein a first leg produces $V_{Phase1}$, a second leg produces $V_{neutral}$, and a third leg produces $V_{Phase2}$ and wherein $V_{Phase1}$ is out of phase with $V_{Phase2}$;

(b) a controller/driver circuit having a switching waveform generator and first and second sinusoidal reference waveform generators, the sinusoidal waveforms generated at the desired AC output frequency, and the switching signal generated at a higher frequency;

(c) means for comparing the switching waveform with the first reference waveform to produce a first pulse width modulated signal which drives the first leg;

(d) means for comparing the switching waveform with the second reference waveform to produce a second pulse width modulated signal which drives the third leg;

(e) means for determining the slope of the switching waveform which drives the second leg with a 50% duty cycle.

In another aspect, the invention may comprise a method of converting DC power to two-phase AC power utilizing three one-leg switch mode inverters wherein the first leg produces $V_{Phase1}$, the third leg produces $V_{Phase2}$ and the second leg produces $V_{Neutral}$ and wherein $V_{Phase1}$ is out of phase with $V_{Phase2}$, comprising the steps of:

(a) generating a first reference sinusoidal waveform and a second reference sinusoidal waveform which is out of phase with the first reference waveform, (b) generating a switching waveform having a higher frequency than the first and second reference waveforms;

(c) comparing the switching waveform with the first reference waveform to produce a first pulse width modulated signal which drives the first leg;

(d) comparing the switching waveform with the second reference waveform to produce a second pulse width modulated signal which drives the third leg;

(e) determining the slope of the switching waveform which drives the second leg with a 50% duty cycle; and (f) filtering the switching waveform from $V_{Phase1} V_{Neutral}$ and from $V_{Phase2} V_{Neutral}$.

DETAILED DESCRIPTION

The present invention provides for a method and apparatus for producing two-phase AC power from a DC power source. When describing the present invention, all terms not defined herein have their common art-recognized meanings.

Three one-leg switch inverters connected in the same topology (10) used commonly in three phase inverter systems and generally called a "three-phase bridge" may be used with a modified switching pattern to generate a two-phase system from a single DC-link and without the technical need for an output transformer or a split DC-link. As a result, a power conditioning system utilizing such a system may be smaller, lighter and more efficient than those utilizing a transformer.

Figure 1:
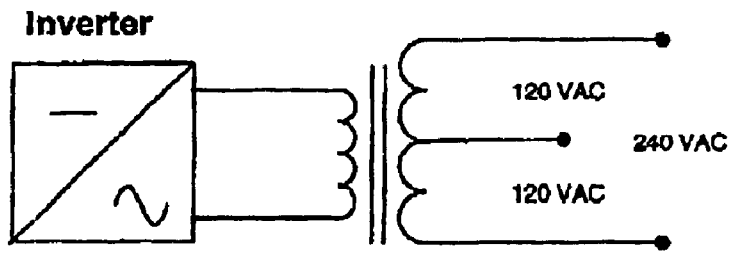
FIG. 1 (Prior Art) is a schematic circuit diagram of a typical circuit used to provide two-phase AC power from a single-phase inverter.
Figure 2:
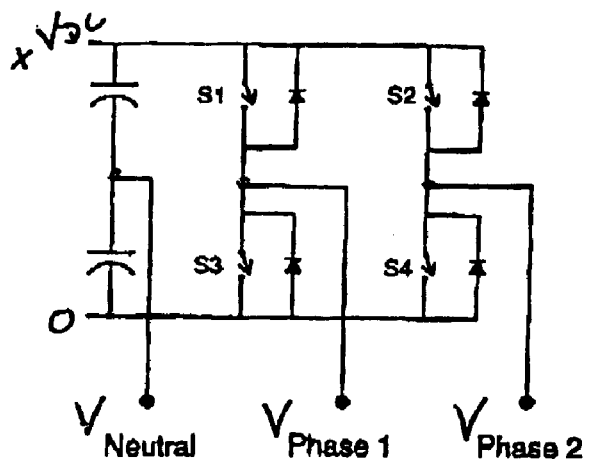
FIG. 2 (Prior Art) is a schematic circuit diagram of a transformerless circuit used to provide two-phase AC power from a DC source having a mid-potential connection.
Figure 3:
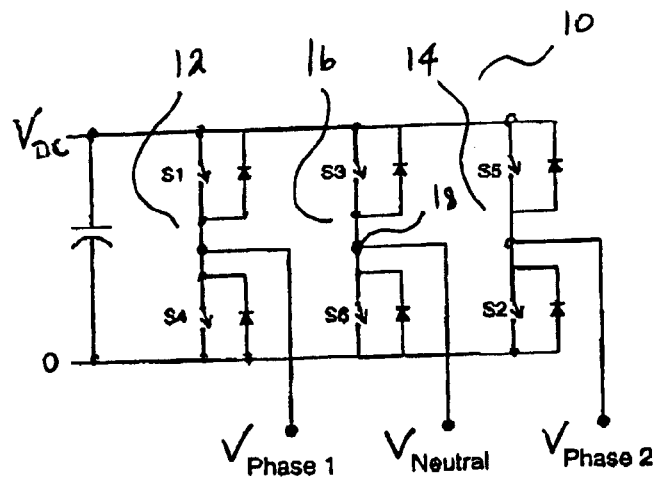
FIG. 3 is a schematic circuit diagram of a three-phase bridge inverter circuit gated to provide two-phase AC power in accordance with the invention.
Figure 5:
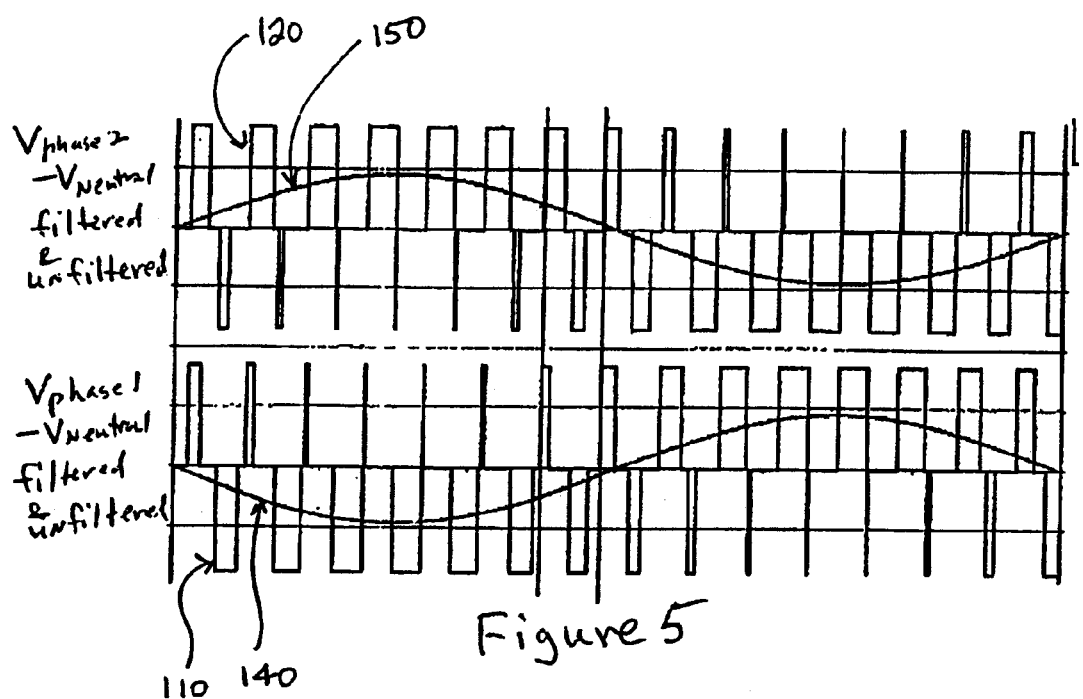
FIG. 5 is a composite timing diagram showing the switching control signal, the reference signals, and the voltages at selected points in FIGS. 3 and 4 as well as filtered output voltages.

A three-phase bridge (10) may be used as shown in FIG. 3 to provide a two-phase system without the need for the output transformer and without the risk of creating an unbalance in the DC-link. In this case, the voltages between each of the phases (Phase 1 and Phase 2) and neutral would be 120 VAC and the voltages should be 180 degrees out of phase to produce a 240 VAC source between Phase 1 and Phase 2. This is accomplished by modifying the switching pattern of the electronic switches (S1 to S6) as shown in FIG. 3 such that one output, labeled $V_{Neutral}$ is used as a neutral and the other two outputs, labeled $V_{Phase1}$ and $V_{Phase2}$, are modulated to produce the required sinusoidal waveforms. The unfiltered and filtered waveforms of $V_{Phase1}-V_{Neutral}$ and $V_{Phase2}-V_{Neutral}$ produced as a result of a switching pattern of the present invention are shown in FIG. 5.

Figure 4:
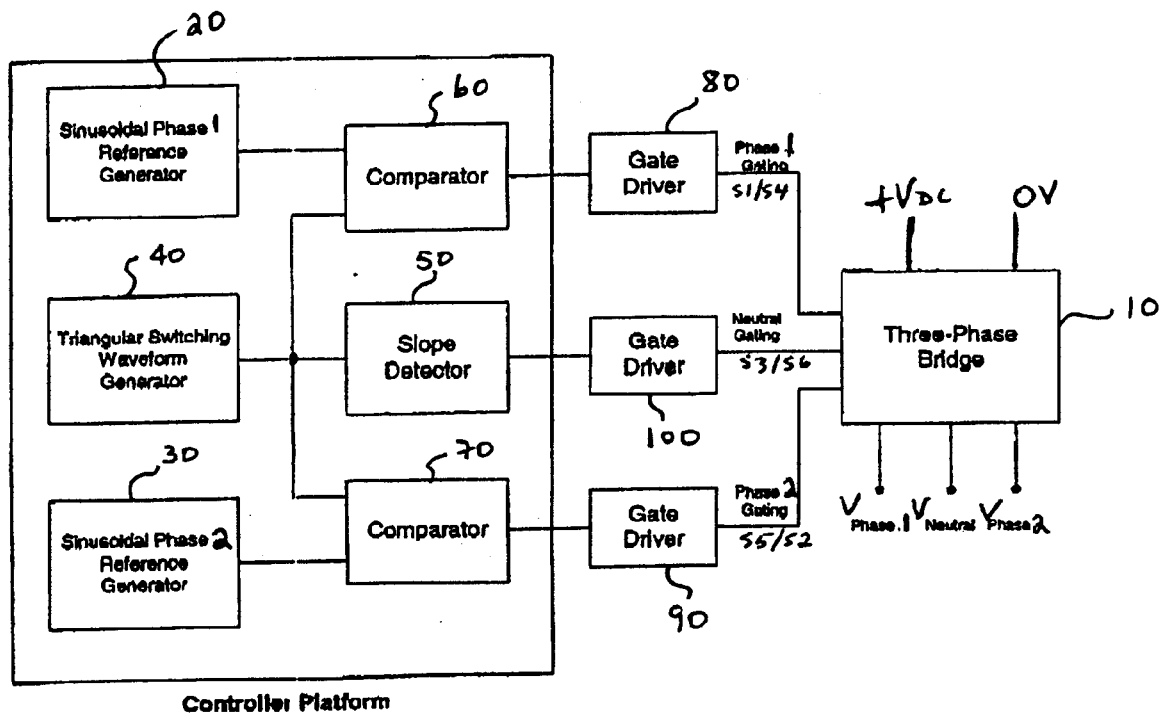
FIG. 4 is a block diagram of the electronics of a controller and the gating arrangement for driving the inverter circuit of FIG. 3.

An exemplary implementation of the inverter circuit is shown in FIG. 4 and includes a first sinusoidal reference frequency generator (20), a second sinusoidal reference frequency generator (30), a switching waveform generator (40), a slope detector (50), and two comparators (60, 70) which each generate a PWM signal by comparing the switching signal with the sinusoidal reference signals. The reference and switching frequency generators (20, 30, 40) are well known in the art, as are the slope detector and the comparators. The PWM comparators may be the same as those used in conventional inverters. The switching waveform is preferably triangular, however it may also be a sawtooth waveform or other suitable switching waveform.

The first PWM signal actuates a first gate driver (80) which actuates the switches (S1 and S4) on the first leg (12) of the three-phase bridge (10). Similarly, the second PWM signal actuates the second gate driver (90) which actuates the switches (S5 and S2) on the third leg (14) of the three-phase bridge (10). The slope detector (50) actuates the third gate driver (100) which actuates the switches (S3 and S6) on the second or neutral leg (16) in accordance with slope of the triangular waveform. The gate drivers (80, 90, 100) serve as interfaces between the low voltage portion of the circuit and the power switches (S1 to S6) and are well known in the art.

The sinusoidal reference frequency will be the same as the desired frequency of V1 and V2 but will be 180° out of phase with each other. In one embodiment, the sinusoidal reference frequency is 60 Hz. The frequency of the triangular waveform signal is of a higher frequency, preferably at least one order of magnitude higher and more preferably in the range of 1 kilohertz or higher. However, in the Figures, the frequency of the triangular waveform is shown as 900 Hz for the purpose of illustrating the concepts involved in the present invention.

The neutral leg (16) of half bridge segment (electronic switches S3 and S6) is operated with a constant duty cycle of 50% to allow alternative and equal segments of positive and zero voltage at the neutral point (18). In other words, each of switches S3 and S6 are on for equal periods of time. This means that the average voltage of the neutral point (18) is half the DC-link voltage. The pulse widths for the other two legs (12, 14) are modulated to produce the desired sinusoidal waveforms after filtering the resulting square pulses. In this form, the control of each of the two phases is completely independent, and the operation is not limited to traditional two-phase systems. As a result, any voltage level and any phase shift may by achieved by altering the switching pattern to achieve the desired results. Furthermore, one of the phases may be voltage controlled and the other current controlled, if desired, which gives complete flexibility to the control strategy.

FIG. 5 shows the unfiltered outputs of $V_{phase1}-V_{neutral}$ (110) and $V_{phase2}-V_{neutral}$ (120) which incorporates the switching waveform (130). When the switching waveform is filtered out, the desired sinusoidal waveforms (140, 150) are produced.

Figure 6:
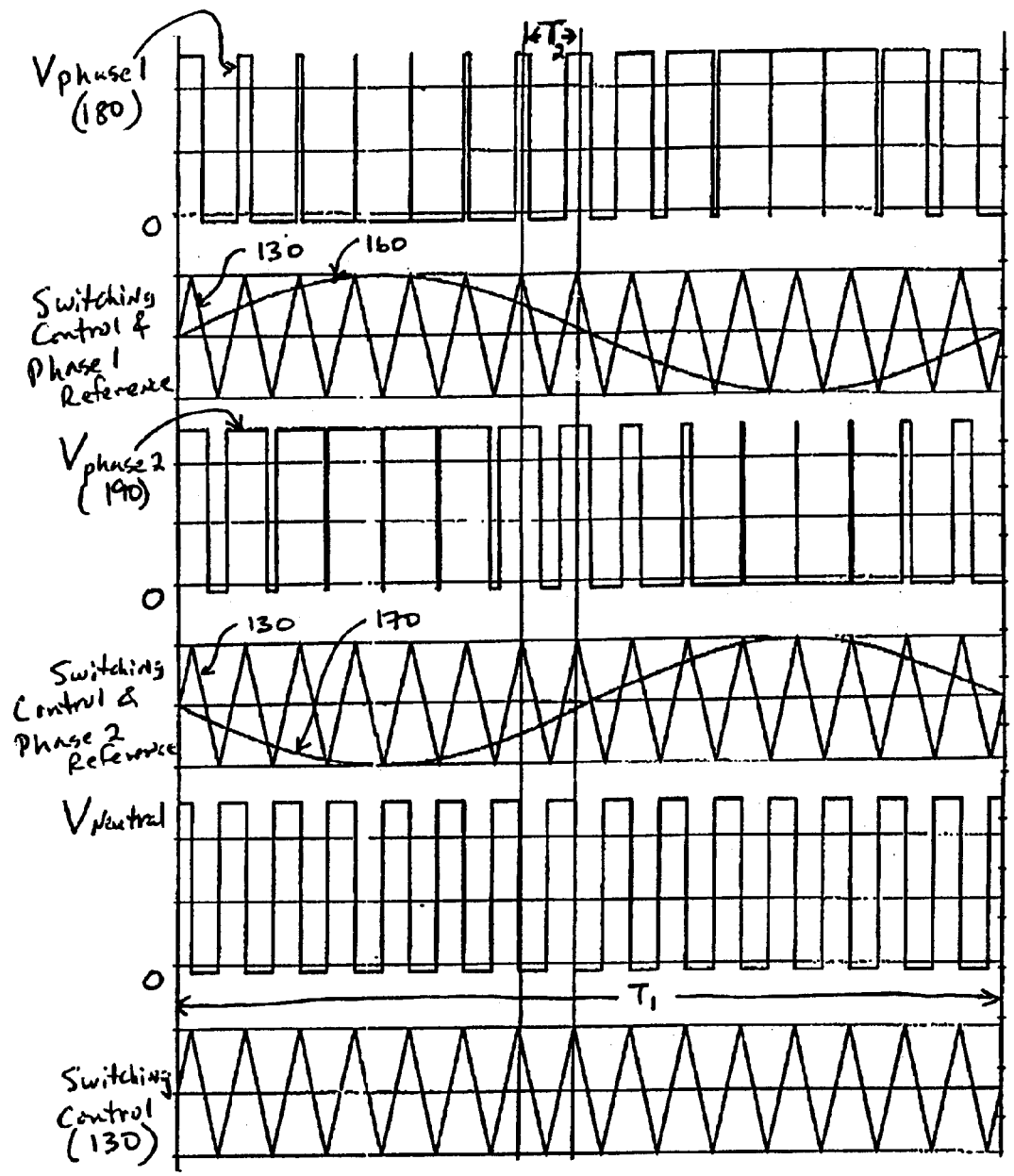
FIG. 6 is a composite timing diagram that is an expansion of a portion of FIG. 5 showing an example of the gating pattern.

FIG. 6 illustrates the triangular switching control signal (130), the two out-of-phase sinusoidal reference signals (160, 170), and the two desired voltages $V_{Phase1}$ (180) and $V_{Phase2}$ (190). The output voltages, $(V_{Phase2}-V_{Neutral})$ and $(V_{Phase1}-V_{neutral})$ are shown in FIG. 5. Because the switching frequency is much higher than the sinusoidal frequency, the output voltages are easily filtered to produce only the desired sinusoidal waveform. The time segment ($T_1$) shown is one cycle for the output voltages, typically 1/60 second for 60 Hz operation.

Figure 7:
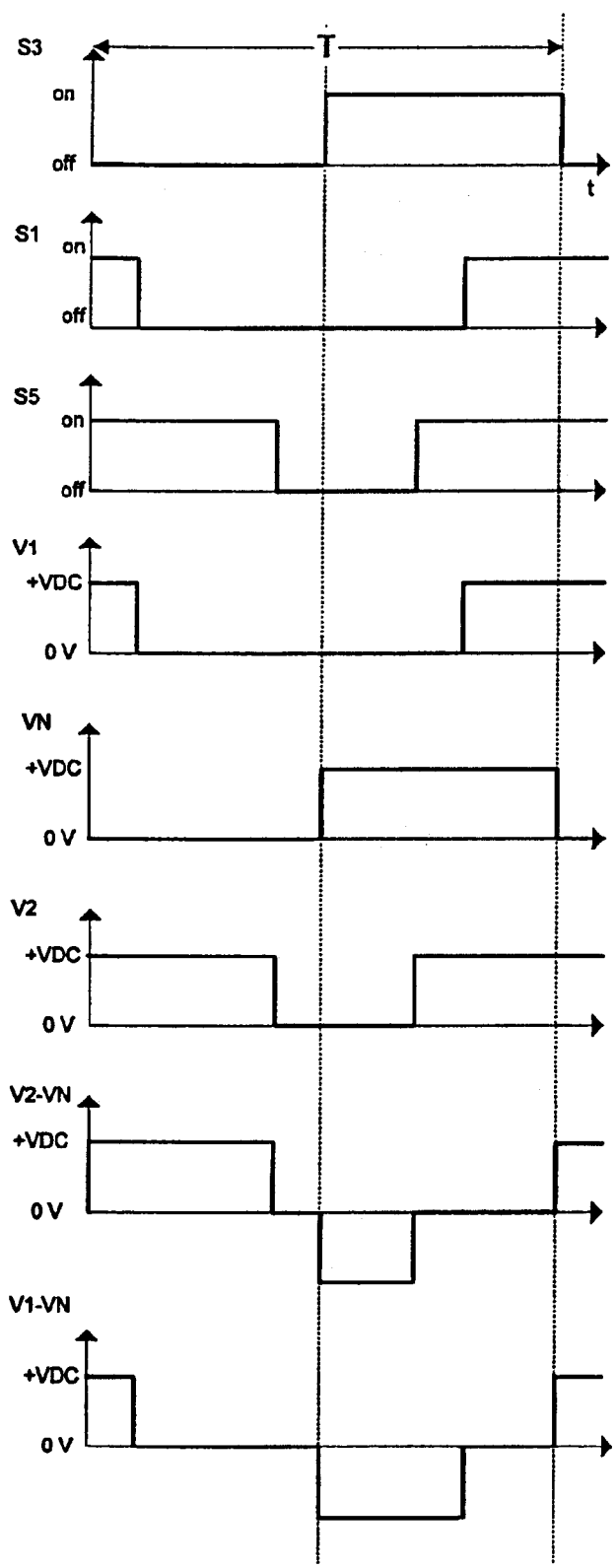
FIG. 7 is the gating pattern needed to achieve the switch operation for the period "$T_2$" of FIG. 6.

An example of the gating pattern needed to achieve the required switch operation for the period labeled "$T_2$" in FIG. 6 is shown in FIG. 7 for the upper switches. The gate signals for the lower switches are not shown but are complementary of the gate signals shown in FIG. 7. FIG. 7 also includes the resulting voltage between each of Phase1 and Phase2 and Neutral for the specific pulse widths. The average voltage for each of the phases with respect of the neutral, which results from filtering the voltage pulses in FIG. 6, can be individually changed between VDC/2 and VDC/2 by changing the pulse width of the corresponding legs. For the specific example in FIG. 7, the average voltage between the Phase 1 and Neutral outputs is negative while the average voltage between Phase 2 and Neutral outputs is positive. As those skilled in the art will understand, the description provided herein assumes ideal switches with no losses and instantaneous switching. Hence the drawings provided are idealizations of the actual waveforms that would be observed in an embodiment of the invention.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. An apparatus for converting DC power to two-phase AC power, comprising:
   (a) three one-leg switch inverters wherein a first leg produces VPhase1, the second leg produces Vneutral, and the third leg produces VPhase2 and wherein VPhase1 is out of phase with VPhase2;
   (b) a controller/driver circuit having a switching waveform generator and first and second sinusoidal reference waveform generators, the sinusoidal waveforms generated at the desired AC output frequency, and the switching signal generated at a higher frequency;
   (c) means for comparing the switching waveform with the first reference waveform to produce a first pulse width modulated signal which drives the first leg;

(d) means for comparing the switching waveform with the second reference waveform to produce a second pulse width modulated signal which drives the third leg;

(e) means for determining the slope of the switching waveform which drives the second leg with a 50% duty cycle.

2. The apparatus of claim 1 wherein the first reference waveform is 180° out of phase with the second reference waveform resulting in VPhase1 being 180° out of phase with VPhase2.

3. The apparatus of claim 1 wherein the switching waveform is triangular.

4. The apparatus of claim 1 wherein the reference waveforms have a frequency of 60 Hz.

5. The apparatus of claim 4 wherein the frequency of the switching waveform is at least 10 times the frequency of the reference waveforms.

6. The apparatus of claim 5 wherein the frequency of the switching waveform is greater than about 1 kHz.

7. A method of converting DC power to two-phase AC power utilizing a three-phase bridge circuit having a first leg, a second leg, and a third leg wherein the first leg produces VPhase1, the third leg produces VPhase2 and the second leg produces Vneutral and wherein VPhase1 is out of phase with VPhase2, comprising the steps of:

(a) generating a first reference sinusoidal waveform and a second reference sinusoidal waveform which is out of phase with the first reference waveform;

(b) generating a switching waveform having a higher frequency than the first and second reference waveforms;

(c) comparing the switching waveform with the first reference waveform to produce a first pulse width modulated signal which drives the first leg;

(d) comparing the switching waveform with the second reference waveform to produce a second pulse width modulated signal which drives the third leg;

(e) determining the slope of the switching waveform which drives the second leg with a 50% duty cycle; and (f) filtering the switching waveform from VPhase1 Vneutral and from Vphase2 Vneutral.

8. The method of claim 7 wherein the reference waveforms have a frequency of 60 Hz.

9. The method of claim 8 wherein the switching waveform has a frequency greater than the reference waveform.

10. The method of claim 9 wherein the switching waveform has a frequency of between about 1 KHz to about 10 Khz.

11. The method of claim 7 wherein the switching waveform is triangular.

12. The method of claim 7 wherein one of the first or third legs is modulated to be voltage controlled and the other leg is modulated to be current controlled.

* * * * *